(12) United States Patent
Miyamoto et al.

(10) Patent No.: US 8,107,143 B2
(45) Date of Patent: Jan. 31, 2012

(54) OPTICAL DEVICE, LABELED ARTICLE, AND OPTICAL KIT

(75) Inventors: Eri Miyamoto, Tokyo (JP); Toshiki Toda, Tokyo (JP); Yasushi Kishimoto, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 209 days.

(21) Appl. No.: 12/153,892

(22) Filed: May 27, 2008

(65) Prior Publication Data

US 2008/0239216 A1 Oct. 2, 2008

Related U.S. Application Data

(63) Continuation of application No. PCT/JP2007/068659, filed on Sep. 26, 2007.

(30) Foreign Application Priority Data

| Sep. 27, 2006 | (JP) | 2006-262341 |
| Apr. 4, 2007 | (JP) | 2007-098629 |
| Jun. 27, 2007 | (JP) | 2007-169509 |

(51) Int. Cl.
*G03H 1/00* (2006.01)
(52) U.S. Cl. .......................................................... 359/2
(58) Field of Classification Search ........................ 359/2
See application file for complete search history.

(56) References Cited

U.S. PATENT DOCUMENTS

| 5,635,105 A * | 6/1997 | Kawata et al. | 252/299.01 |
| 7,088,405 B2 * | 8/2006 | Kotchick et al. | 349/114 |
| 7,292,292 B2 * | 11/2007 | Schadt et al. | 349/98 |
| 2002/0172807 A1 * | 11/2002 | Ridyard et al. | 428/195 |
| 2004/0240006 A1 * | 12/2004 | Staub et al. | 359/2 |
| 2005/0123755 A1 * | 6/2005 | Argoitia et al. | 428/402 |
| 2007/0014936 A1 | 1/2007 | Katschorek et al. | |

FOREIGN PATENT DOCUMENTS

| CN | 1608217 A | 4/2005 |
| EP | 1 684 098 A1 | 7/2006 |

(Continued)

OTHER PUBLICATIONS

English Translation of the International Preliminary Report on Patentability mailed Apr. 20, 2009 and issued in corresponding International Patent Application PCT/JP2007/068659.
Communication issued on Dec. 9, 2010 by the European Patent Office in the related European patent application No. 07807874.8.
Chinese Office Action issued Jul. 14, 2010 in corresponding Chinese Patent Application 200780001662.9.
International Search Report mailed on Jan. 15, 2008 in connection with the International Application No. PCT/JP2007/068659.

*Primary Examiner* — Phu Vu
(74) *Attorney, Agent, or Firm* — Staas & Halsey LLP

(57) ABSTRACT

Increased is the variety of changes of an image in accordance with observation conditions displayed on an optical device including a solidified liquid crystal material. An optical device includes a layered structure including a recess-forming layer with light-transmitting property, a main surface of which includes one or more recess-forming regions each provided with first grooves equal in longitudinal directions to one another and adjacent to one another in a direction crossing the longitudinal directions, and a liquid crystal layer supported by the main surface and made of a solidified liquid crystal material, and a reflection layer facing the layered structure.

1 Claim, 8 Drawing Sheets

FOREIGN PATENT DOCUMENTS

| | | |
|---|---|---|
| JP | 2001-63300 | 3/2001 |
| WO | WO 2004/095090 A1 | 11/2004 |
| WO | 2005/029135 A2 | 3/2005 |
| WO | WO 2005/101101 A2 | 10/2005 |
| WO | WO 2006/007742 A1 | 1/2006 |
| WO | WO 2006/084686 A2 | 8/2006 |

* cited by examiner

OPTICAL DEVICE, LABELED ARTICLE, AND OPTICAL KIT

CROSS REFERENCE TO RELATED APPLICATIONS

This is a Continuation Application of PCT Application No. PCT/JP2007/068659, filed Sep. 26, 2007, which was published under PCT Article 21(2) in Japanese.

This application is based upon and claims the benefit of priority from prior Japanese Patent Applications No. 2006-262341, filed Sep. 27, 2006; No. 2007-098629, filed Apr. 4, 2007; and No. 2007-169509, filed Jun. 27, 2007, the entire contents of all of which are incorporated herein by reference.

BACKGROUND OF THE INVENTION

1. Field of the Invention

The present invention relates to a display technique that provides, for example, forgery-preventing effect, decorative effect and/or aesthetic effect.

2. Description of the Related Art

For forgery prevention, latent images are used in some cases. A latent image can be produced utilizing line screen moiré or intaglio printing, for example.

A latent image utilizing line screen moiré can be obtained by superposing an image to be produced as a latent image on a multiple of lines arranged at a high density. The image is difficult to discriminate due to the multiple lines when observed by the unaided eye, and is made easy to discriminate by hiding the lines.

A latent image utilizing intaglio printing can be obtained by forming a recessed pattern and/or a protrusion pattern on an ink layer. The image produced by the recessed pattern and/or the protrusion pattern is difficult to discriminate when observed from the front, and is visualized when observed obliquely.

The forgery-preventing technique utilizing the line screen moiré or the intaglio printing is comparatively easy in discriminating a genuine one from a counterfeit. However, the images produced by such methods are not the ones that are impossible to discriminate when observed by the unaided eye. Thus, the presence of the latent images is prone to be noticed.

A latent image can also be produced using special ink such as fluorescent ink or infrared radiation-absorbing ink. Fluorescent ink is the one that emits light when exposed to ultraviolet radiation, and a latent image produced using this is visualized by ultraviolet irradiation. Infrared radiation-absorbing ink is the one that is high in absorptance for infrared radiation, and a latent image produced using this is visualized when observed using an infrared camera, for example.

The presence of a latent image produced using the special ink is less prone to be noticed. However, in order to visualize it, an ultraviolet lamp or an infrared camera is necessary.

A latent image can also be produced using a liquid crystal material. For example, a patterned thin layer made of a solidified liquid crystal material such as liquid crystal polymer is formed on a substrate having light-reflecting property. The mesogens of the liquid crystal molecules are aligned almost in a single direction by subjecting the surface underlying the patterned thin film to an alignment process such as rubbing process or photo-alignment process.

When observed by the unaided eye, the patterned thin film is seen in the same manner as an optically isotropic layer. Thus, a latent image can be produced using the patterned thin film. In addition, since the patterned thin film functions as a retardation layer, when observed through a polarizer, it causes a change in brightness according to the angle that the slow axis forms with the transmission axis of the polarizer. That is, the latent image that the patterned thin film produces is visualized when observed through a polarizer.

The presence of a latent image produced using a liquid crystal material is less prone to be noticed. In addition, this latent image can be visualized with a polarizer such as polarizing film, thus a bulky apparatus is unnecessary. For these reasons, the forgery-preventing technique utilizing a liquid crystal material attracts keen interest.

For example, JP-A 2001-63300 (KOKAI) describes stacking an OVD (optically variable device) layer and a latent image formation layer one on the other. The latent image formation layer is, for example, made of a polymer liquid crystal material. The OVD layer is, for example, a hologram.

When observing such a layered structure by the unaided eye, the visual effect of the hologram, that is, iridescence and a color shift in accordance with the observation angle can be perceived. On the other hand, the latent image that the latent image formation layer produces is visualized when observed via a polarizer. Thus, the combined use of a liquid crystal material and a hologram makes it possible to produce an image that changes variously. Therefore, it is possible to achieve a greater forgery-preventing effect as compared with the case where only the liquid crystal material is used.

However, the technological advances are significant. Thus, a further advancement of the forgery-preventing technique is desired.

BRIEF SUMMARY OF THE INVENTION

An object of the present invention is to increase the variety of changes of an image in accordance with observation conditions displayed on an optical device including a solidified liquid crystal material.

According to a first aspect of the present invention, there is provided an optical device comprising a layered structure including a recess-forming layer with light-transmitting property, a main surface of which includes one or more recess-forming regions each provided with first grooves equal in longitudinal directions to one another and adjacent to one another in a direction crossing the longitudinal directions, and a liquid crystal layer supported by the main surface and made of a solidified liquid crystal material, and a first refection layer facing the layered structure.

According to a second aspect of the present invention, there is provided a labeled article comprising the optical device according to the first aspect, and an article supporting it.

According to a third aspect of the present invention, there is provided an optical kit comprising the optical device according to the first aspect, and a polarizer.

According to a fourth aspect of the present invention, there is provided a method of discriminating an article whose genuineness is unknown between a genuine article and a non-genuine article, the genuine article being an article supporting the optical device according to the first aspect, comprising judging the article whose genuineness is unknown as a non-genuine article in a case where the article whose genuineness is unknown does not include a latent image that does not visualized when observed obliquely to the main surface with no polarizer and when observed perpendicularly to the main surface with no polarizer and is visualized when observed perpendicularly to the main surface via a polarizer, or judging the article whose genuineness is unknown as a non-genuine article in a case where the article whose genuineness is unknown does not include a first display portion that displays a color when observed obliquely to the main surface with no polarizer equal to a color displayed when observed perpendicularly to the main surface with no polarizer, displays a color when observed perpendicularly to the main surface via a polarizer different from a color displayed when observed perpendicularly to the main surface with no polarizer, and displays a color when observed obliquely to the main surface via the polarizer different from a color displayed when observed perpendicularly to the main surface with no polarizer and a color displayed when observed perpendicularly to the main surface via the polarizer.

DETAILED DESCRIPTION OF THE INVENTION

Figure 1:
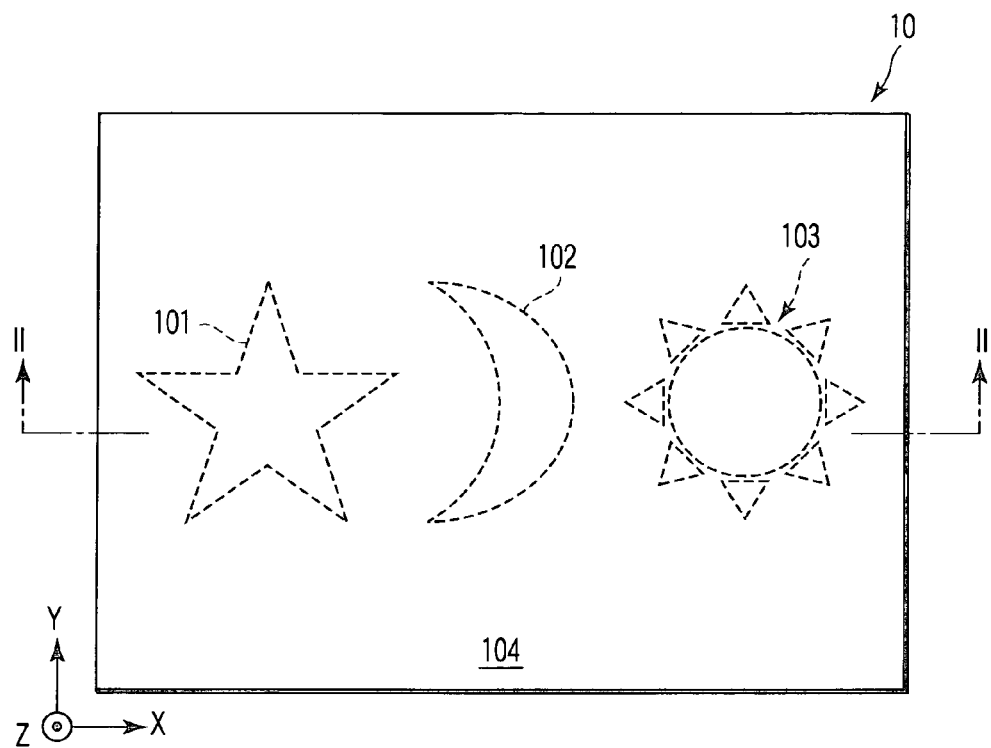
FIG. 1 is a plan view schematically showing an optical device according to the first embodiment of the present invention.

An embodiment of the present invention will be described below. In the drawings, the same reference symbols denote components having the same or similar functions and duplicate descriptions will be omitted.

Figure 2:
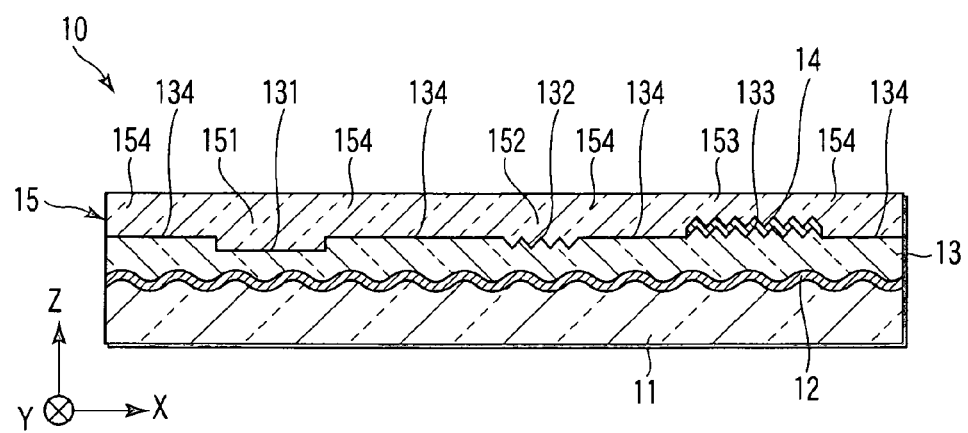
FIG. 2 is a sectional view taken along the line II-II of the optical device shown in FIG. 1.
Figure 3:
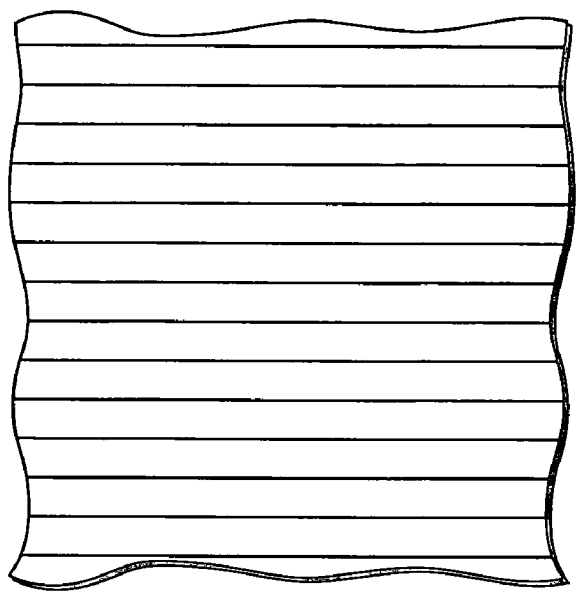
FIG. 3 is a plan view showing an example of the structure that can be employed in a recess-forming region of the optical device shown in FIG. 1.
Figure 4:
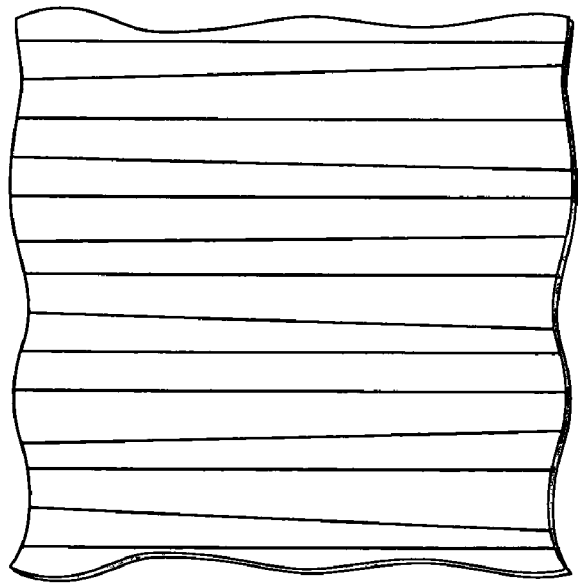
FIG. 4 is a plan view showing another example of the structure that can be employed in a recess-forming region of the optical device shown in FIG. 1.
Figure 5:
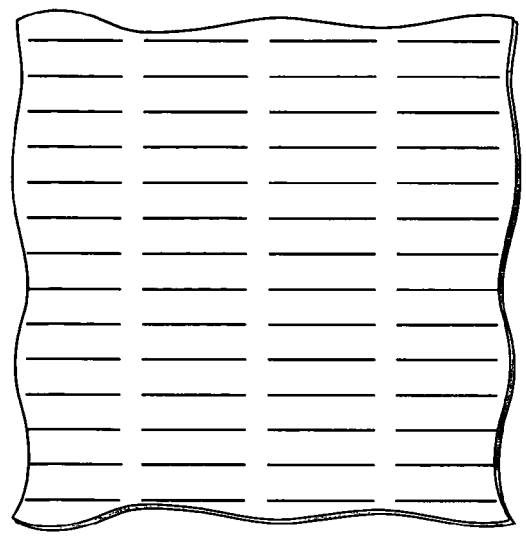
FIG. 5 is a plan view showing another example of the structure that can be employed in a recess-forming region of the optical device shown in FIG. 1.
Figure 6:
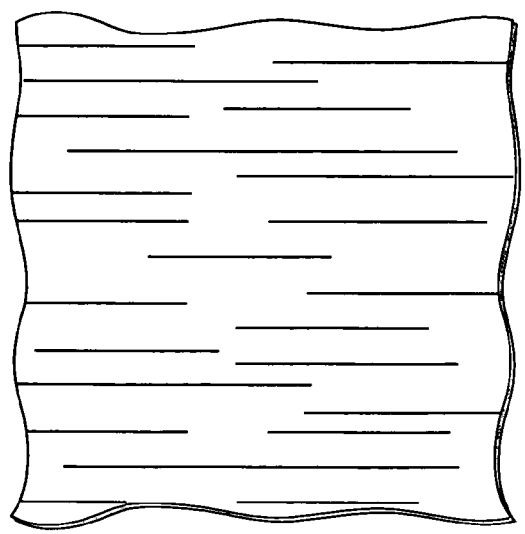
FIG. 6 is a plan view showing still another example of the structure that can be employed in a recess-forming region of the optical device shown in FIG. 1.

FIG. 1 is a plan view schematically showing an optical device according to the first embodiment of the present invention. FIG. 2 is a sectional view taken along the line II-II of the optical device shown in FIG. 1. FIG. 3 is a plan view showing an example of the structure that can be employed in a recess-forming region of the optical device shown in FIG. 1. FIG. 4 is a plan view showing another example of the structure that can be employed in a recess-forming region of the optical device shown in FIG. 1. FIG. 5 is a plan view showing another example of the structure that can be employed in a recess-forming region of the optical device shown in FIG. 1. FIG. 6 is a plan view showing still another example of the structure that can be employed in a recess-forming region of the optical device shown in FIG. 1. Note that in FIGS. 1 and 2, the X direction is a direction parallel with a main surface of the optical device 10, the Y direction is a direction parallel with the main surface of the optical device 10 and perpendicular to the X direction, and the Z direction is a direction perpendicular to the X and Y directions.

The optical device shown in FIGS. 1 and 2 is, for example, a display to be supported by an article whose genuineness should be verified. The optical device 10 includes a substrate 11, a first reflection layer 12, a recess-forming layer 13, a second reflection layer 14 and a liquid crystal layer 15. The front surface of the optical device 10 is the surface on the side of the liquid crystal layer 15.

The substrate 11 is, for example, a film or sheet made of resin such as polyethylene terephthalate (PET). The front surface of the substrate 11 is provided with fine relief. The substrate 11 may have light-transmitting property or not. The substrate 11 may have a monolayer structure or multilayered structure.

The first reflection layer 12 is a reflection layer with light-scattering property. That is, the first reflection layer 12 emits polarized-and-scattered light from a main surface thereof when the main surface is irradiated with polarized-and-collimated light.

The first reflection layer 12 covers the entire surface of the substrate 11. The first reflection layer 12 may cover only a part of the substrate 11.

The front surface of the first reflection layer 12 has a fine relief structure corresponding to the structure of the front surface of the substrate 11. The relief structure diffusely reflects incident light toward various directions.

The front surface of the reflection layer 12 has an arithmetical mean deviation of the assessed profile Ra, which is defined by JIS B0601: 2001 "Geometrical Product Specifications (GPS)—Surface texture: Profile method—Terms, definitions and surface texture parameters" of Japan Industrial Standard, of 0.3 μm or less, for example. The front surface of the reflection layer 12 has a ten-point height of roughness profile $RZ_{JIS}$, which is defined by JIS B0601: 2001, of 4.0 or less, for example. The front surface of the reflection layer 12 has a mean width of the profile elements RSm, which is defined by JIS B0601: 2001, of 1.5 μm or more, for example.

The reflection layer 12 is, for example, a metal layer. As a material of the metal layer, for example, aluminum, silver or an alloy thereof can be used. The metal layer can be formed, for example, by vapor deposition such as evaporation or sputtering.

The reflection layer 12 may be a monolayer or multilayered dielectric film provided with a fine relief structure on the front surface thereof. In the case where a monolayer dielectric film, for example, made of ZnO is utilized as the reflection layer 12, the color of the substrate can be seen when observing the optical device 10 by the unaided eye. In addition, when observing the optical device 10 via a polarizer, the visual effect imparted by the color of the substrate 11 can be added to the visual effect imparted by the liquid crystal layer 12, etc. In the case where a multilayered dielectric film is utilized as the reflection layer 12, it is possible to impart wavelength selectivity to the optical device 10. Therefore, it is possible to achieve a visual effect different from that achieved in the case where the metal deposition layer or the monolayer dielectric film is utilized as the reflection layer 12. The multilayered dielectric film can be obtained, for example, by alternately depositing a high-refractive index material such as zinc sulfide and a low-refractive index material such as magnesium fluoride on the substrate 11.

Here, as an example, it is supposed that the reflection layer 12 is a metal layer.

The recess-forming layer 13 has light-transmitting property and covers the reflection layer 12. The front surface of the recess-forming layer is provided with first grooves. In the present embodiment, the front surface of the recess-forming layer 13 includes three regions 131 to 133 each provided with grooves as shown in FIG. 2. The regions 131 to 133 may be different or equal in the longitudinal directions of the grooves. One or two of the regions 131 to 133 may be omitted. Alternatively, the front surface of the recess-forming layer 13 may further include another region provided with grooves.

Here, as an example, it is supposed that the region 131 is provided with grooves whose longitudinal directions are almost parallel with the X direction, and the region 132 is provided with grooves whose longitudinal directions are almost parallel with the Y direction. In addition, although the longitudinal directions of the grooves provided to the region 133 can be set freely, here, as an example, it is supposed that they form an angle of 45° with the X direction.

The front surface of the recess-forming layer 13 further includes the region 134 with no groove as shown in FIG. 2. The region 134 can be omitted.

The recess-forming regions 131 to 133 can employ various structures. For example, as shown in FIG. 3, each of the recess-forming regions 131 to 133 can employ the structure in which grooves are arranged parallel with one another in the width directions at regular intervals.

As shown in FIG. 4, it is possible that the grooves are not parallel with one another. However, as the arrangement of the grooves is closer to the parallel arrangement, the long axes of liquid crystal molecules or mesogens thereof are prone to align uniformly in respective portions of the liquid crystal layer 14 corresponding to the recess-forming regions 131 and 132. The angles that the grooves form with one another are set at, for example, 5° or less, and preferably 3° or less.

In each of the regions 131 to 133, the grooves may be arranged in length and width directions. The lengths of the grooves may be equal to one another or different from one another. The distances between twos of the grooves adjacent to the longitudinal directions may be uniform or nonuniform. Further, the distances between twos of the grooves adjacent to the width directions may be uniform or nonuniform. For example, as shown in FIG. 5, on each of the recess-forming regions, the groove having the same length may be arranged in length and width directions. Alternatively, as shown in FIG. 6, the grooves having various lengths may be arranged randomly.

In the cases where the structures shown in FIGS. 3 to 5 are employed, by arranging the groove almost parallel with one another while appropriately setting the pitches thereof, it is possible to make the grooves function as a diffraction grating. In the case where the structure shown in FIG. 6 is employed, it is possible to make the grooves function as a unidirectional diffusing pattern. Note that the unidirectional diffusing pattern is a pattern having light-diffusing characteristics that the diffusing capacity in the plane perpendicular to the longitudinal directions of the grooves is greater than the diffusing capacity in the plane perpendicular to the main surface of the recess-forming layer 13 and parallel with the longitudinal directions of the grooves, in other words, a pattern having light-scattering anisotropy. Here, as an example, it is supposed that the grooves provided to each of the regions 131 to 133 form a diffraction grating.

The recess-forming layer 13 can be formed, for example, by recording a hologram pattern using two-beam interference or by drawing a pattern with an electron beam. Alternatively, as is performed in the manufacture of surface-relief holograms, a die provided with linearly extending fine protrusions may be pressed against resin for forming it. For example, the recess-forming layer 13 can be formed by pressing a master provided with linearly extending protrusions against a thermoplastic resin layer formed on the laminate of the substrate 11 and the reflection layer 12 while applying heat, that is, by a heat-embossing process. Alternatively, the recess-forming layer 13 may be formed by applying an ultraviolet-cure resin to the laminate of the substrate 11 and the reflection layer 12, irradiating it with ultraviolet light from the side of the substrate 11 while pressing a master against it so as to cure the ultraviolet-cure resin, and then, removing the master therefrom.

According to these methods, recess-forming regions different in the longitudinal directions can be formed on a single surface. In addition, according to these methods, recess-forming regions different in depths and/or widths of the grooves and/or the grooves, etc. can be formed on a single surface.

The master can be obtained, for example, by recording a hologram pattern using two-beam interference, drawing a pattern with an electron beam, or cutting using a cutting tool so as to obtain a mother die and subjecting the mother die to electroforming. In the case where the recess-forming layer does not have such a variety as described above, the grooves may be formed using rubbing process.

The depths of the grooves are set, for example, within a range of 0.05 μm to 1 μm. The lengths of the groove are set, for example, at 0.5 μm or more. The pitches of the grooves are, for example, 0.1 μm or more, and typically 0.75 μm or more. The pitches of the grooves are, for example, 10 μm or less, and typically 2 μm or less. In order to align the liquid crystal molecules or the mesogens thereof at a high degree of order, it is advantageous that the pitches of the grooves are small.

The second reflection layer 14 is, for example, a metal deposition layer such as aluminum deposition layer. The reflection layer 14 covers the entire of the recess-forming region 133 without covering the other regions of the main surface of the recess-forming layer 13.

The reflection layer 14 may cover only a part of the recess-forming region 133. Alternatively, the reflection layer 14 may further cover a part of the recess-forming region 131 and 132. The reflection layer 14 may cover a part of the region 134 or the entire region 134. In this case, the reflection layer 14 may further cover a part of the recess-forming regions 131 and 132.

The surface profile of the reflection layer 14 corresponds to the surface profile of the underlayer thereof. Here, to the surface of the reflection layer 14, second grooves are provided correspondingly with the first grooves provided to the recess-forming region 133. In the case where the first grooves provided to the recess-forming region 133 form a diffraction grating, the second grooves also form a diffraction grating. Alternatively, in the case where the first grooves provided to the recess-forming region 133 form a unidirectional diffusing pattern, the second grooves also form a unidirectional diffusing pattern.

The liquid crystal layer 15 covers the recess-forming layer 13 and the reflection layer 14. Hereinafter, the portions of the liquid crystal layer 15 formed on the regions 131 to 134 are referred to as liquid crystal portions 151 to 154, respectively. In addition, the regions of the optical device 10 corresponding to the liquid crystal portions 151 to 154 are referred to as display portions 101 to 104, respectively.

The liquid crystal layer 15 is made of a solidified liquid crystal material. That is, the liquid crystal layer 15 is the one formed by eliminating the fluidity from a flowable liquid crystal material.

The liquid crystal layer 15 is, typically, a polymer liquid crystal layer formed by curing a polymerizable liquid crystal material having fluidity using ultraviolet light or heat. The polymer liquid crystal layer can be formed, for example, by the following method. First, a photo-polymerizable nematic liquid crystal material is applied to the recess-forming layer 13 and the reflection layer 14. Then, the liquid crystal material is irradiated with ultraviolet light to cause the polymerization thereof. Thus, the liquid crystal layer 15 in which the longitudinal directions of the liquid crystal molecules or the mesogens thereof are immobilized can be obtained. As the material of the liquid crystal layer 15, cholesteric liquid crystal material or smectic liquid crystal material may be used.

Each of the recess-forming regions 131 and 132 makes the liquid crystal molecules or the mesogen thereof included in the liquid crystal portion 151 align along the longitudinal directions of the grooves. Here, as an example, it is supposed that the long axes of the mesogens are aligned almost in a single direction in each of the liquid crystal portions 151 and 152. That is, here, it is supposed that the mesogens in the liquid crystal portion 151 are aligned in the X direction and the mesogens in the liquid crystal portion 152 are aligned in the Y direction.

Since the mesogens are aligned, the liquid crystal portions 151 and 152 have refractive index anisotropy. In the liquid crystal portion 151, since the mesogens are aligned in the X direction, the refractive index for the X direction is the extraordinary index $n_e$ and the refractive index for the Y direction is the ordinary index $n_o$. The refractive index ne is greater than the refractive index $n_o$, and thus, the slow axis is parallel with the X direction and the fast axis is parallel with the Y direction in the liquid crystal portion 151. On the other hand, in the liquid crystal portion 152, the slow axis is parallel with the Y direction and the fast axis is parallel with the X direction.

Typically, in the liquid crystal portion 153, the mesogens are aligned at a lower degree of order as compared with the liquid crystal portions 151 and 152 or not aligned. Also, in the liquid crystal portion 154, typically, the mesogens are aligned at a lower degree of order as compared with the liquid crystal portion 153 or not aligned. Here, as an example, it is supposed that the mesogens are not aligned in the liquid crystal portions 153 and 154. That is, it is supposed that the liquid crystal portions 153 and 154 are optically isotropic. Note that in the liquid crystal portion 154, the mesogens can be aligned at a relatively high degree of order, for example, by subjecting the region 134 to an alignment process such as rubbing process.

Next, the image that can be seen when the optical device 10 is irradiated with white light and observed by the unaided eye will be described. Note that the white light is the light constituted by all the non-polarized light components having wavelengths within the visible region.

Figure 7:
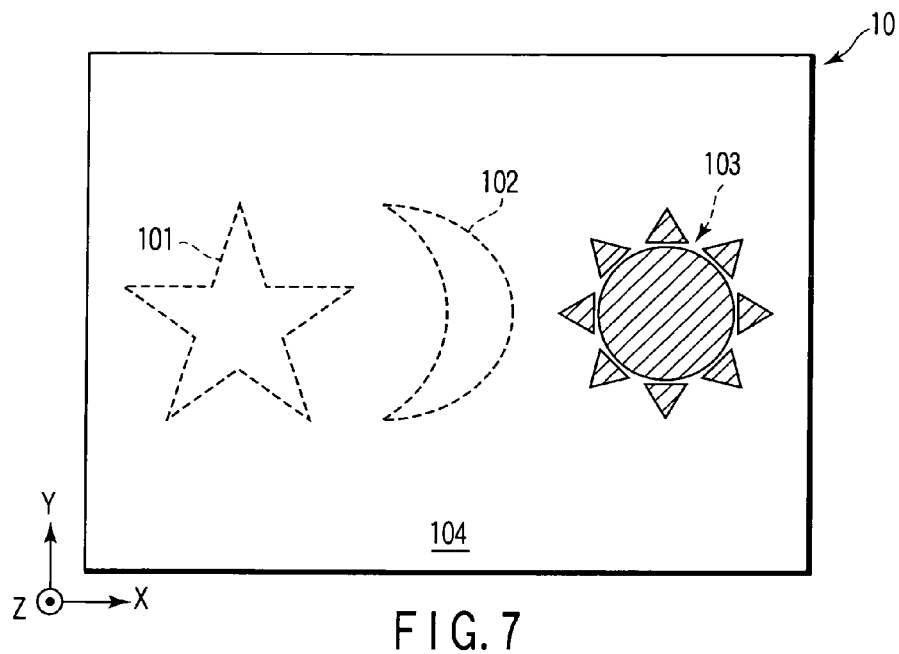
FIG. 7 is a plane view showing an example of the image that the optical device shown in FIGS. 1 and 2 displays.

FIG. 7 is a plane view showing an example of the image that the optical image shown in FIGS. 1 and 2 displays.

In the case where the optical device 10 is irradiated with white light and observed from the front by the unaided eye, the display portions 101, 102 and 104 are difficult to discriminate from one another and the display portion 103 is easy to discriminate from the display portions 101, 102 and 104 as shown in FIG. 7. This will be described in more detail.

The white light incident on the display portion 101 as illumination light passes through the liquid crystal portion 151 shown in FIG. 2 and enters the region 131. Since the grooves provided to the region 131 form a diffraction grating, a part of the incident light enters the recess-forming layer 13 as diffracted light. The reflection layer 12 reflects the diffracted light having passed through the recess-forming layer 13. Since the reflection layer 12 has light-scattering property, the reflected light is scattered light. The scattered light passes through the recess-forming layer 13. Although the front surface of the recess-forming layer 13 is provided with the diffraction grating, the reflected light from the reflection layer 12 is scattered light and the illumination light has different incident angles in ordinary environment. Thus, the reflected light from the reflection layer 12 enters the liquid crystal portion 151 as scattered light. Then, the scattered light passes through the liquid crystal portion 151 and an observer sees the scattered light as display light. Therefore, the display portion 101 is seen silver whitely.

Except for the planar shapes, the display portion 102 and the display portion 101 are different from each other only in the longitudinal directions of the grooves forming the diffraction gratings. As will be apparent from the description above, in the case where the display portion 101 is observed by the unaided eye, the diffraction grating does not affect the display color and the brightness. Therefore, the display portion 102 is also seen silver whitely.

The white light incident on the display portion 103 as illumination light passes through the liquid crystal portion 153 and enters the reflection layer 14. Since the grooves provided to the reflection layer 14 form a diffraction grating, the light reflected by the reflection layer 14 is diffracted light. The diffracted light passes through the liquid crystal portion 153 and the observer see the diffracted light as display light. Therefore, the display portion 103 is seen iridescently. In other words, the display portion 103 displays interference colors.

Except for the planar shapes, the display portion 104 is different from the display portion 101 only in the respect that no groove is provided to the corresponding positions of the recess-forming layer 13 and the mesogens are not aligned. As will be apparent from the description above, in the case where the display portion 101 is observed by the unaided eye, the diffraction grating does not affect the display color and the brightness. Therefore, the display portion 104 is also seen silver whitely.

As above, the display portions 101, 102 and 104 are seen silver whitely, while the display portion 103 is seen iridescently. In addition, the display portions 101, 102 and 104 are almost equal in brightness. Therefore, in the case where the optical device 10 is irradiated with white light and observed from the front by the unaided eye, the display portions 101, 102 and 104 are difficult to discriminate from one another and the display portion 103 is easy to discriminate from the display portions 101, 102 and 104 as shown in FIG. 7.

Note that in the case where the optical device is irradiated with white light and observed by the unaided eye, the display colors of the display portions 101, 102 and 104 stay unchanged at silver white even if observation angle is changed, while the display color of the display portion 103 is changed according to the observation angle. Note also that when the optical device 10 is rotated about the normal line thereof with the observation angle kept oblique, the display colors of the display portions 101, 102 and 104 stay unchanged at silver white, while the display color of the display portion 103 is changed according to the rotation angle.

Next, the image that can be seen when the optical device 10 is observed via a polarizer will be described. Here, as an example, it is supposed that a linearly polarizing film is used as the polarizer.

Figure 8:
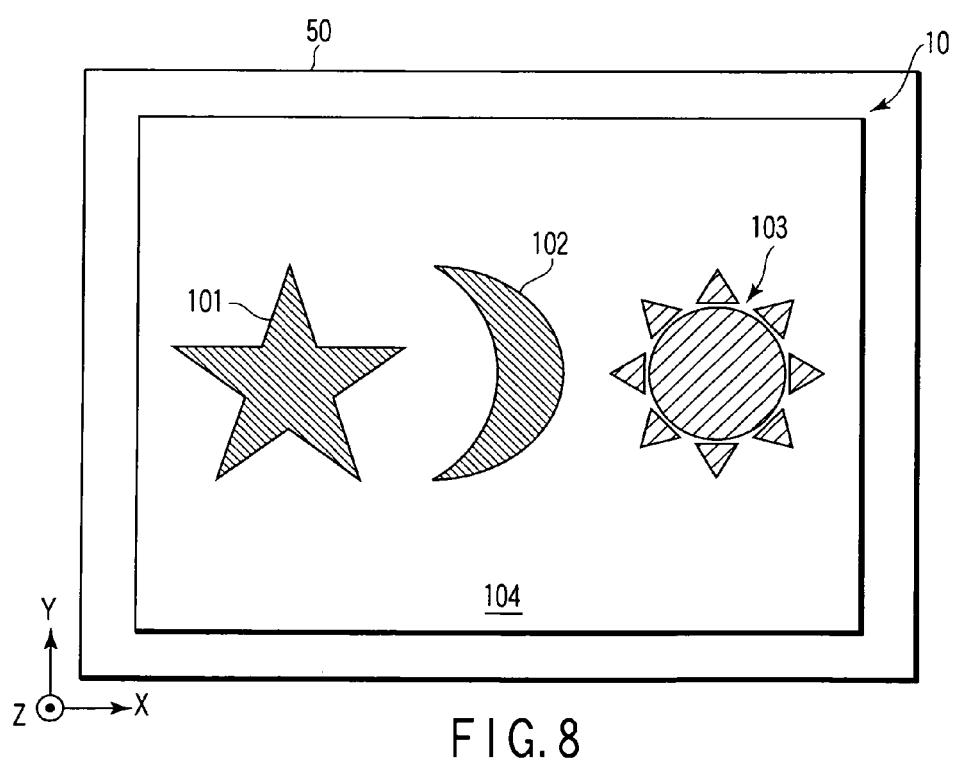
FIG. 8 is a plan view schematically showing an example of the image that can be observed when a linear polarizer film is superposed on the optical device shown in FIGS. 1 and 2.

FIG. 8 is a plan view schematically showing an example of the image that can be observed when a linear polarizer film is superposed on the optical device shown in FIGS. 1 and 2.

In FIG. 8, the optical device 10 shown in FIGS. 1 and 2 and the absorptive linearly polarizing film 50 are superposed such that the transmission axis of the polarizing film 50 forms an angle of 45° in counterclockwise direction with respect to the X direction when observing the optical device 10 from the side of the polarizing film 50. When such an arrangement is employed and the structure is observed from the front, the display portions 101 to 103 are easy to discriminate from the display portion 104; and the display portions 101 and 102 are easy to discriminate from the display portion 103 and are impossible or difficult to discriminate from each other as shown in FIG. 8. This will be described in more detail.

When the linearly polarizing film 50 is irradiated with white light as illumination light, the linearly polarizing film 50 transmits linearly polarized light having a plane of polarization, i.e., a vibrating surface of electric field vector parallel with the transmission axis thereof, and absorbs linearly polarized light having a plane of polarization perpendicular to the transmission axis.

The linearly polarized light incident on the display portion 101 passes through the liquid crystal portion 151 shown in FIG. 2. In the liquid crystal portion 151, the mesogens are aligned almost parallel with the X direction. That is, the slow axis of the liquid crystal portion 151 is parallel with the direction that forms an angle of 45° in counterclockwise direction with respect to the transmission axis of the polarizing film 50 when observing the optical device 10 from the side of the polarizing film 50. Therefore, for example, of the linearly polarized light, a certain light component having a particular wavelength $\lambda_0$ passes through the liquid crystal portion 151 so as to be converted into right-handed circularly polarized light, while the other light components pass through the liquid crystal portion 151 so as to be converted into right-handed elliptically polarized light.

The right-handed circularly polarized light and the right-handed elliptically polarized light enter the region 131. Since the grooves provided to the region 131 form a diffraction grating, a part of the incident light enters the recess-forming layer 13 as diffracted light.

The reflection layer 12 reflects the right-handed circularly polarized light and the right-handed elliptically polarized light having passed through the recess-forming layer 13. By the reflection on the reflection layer 12, the right-handed circularly polarized light and the right-handed elliptically polarized light are converted into left-handed circularly polarized light and left-handed elliptically polarized light, respectively. Note that the reflected light is scattered light because the reflection layer 12 has light-scattering property.

The left-handed circularly polarized light and left-handed elliptically polarized light as the scattered light pass through the recess-forming layer 13. Although the front surface of the recess-forming layer 13 is provided with the diffraction grating, the reflected light from the reflection layer 12 is the scattered light and the illumination light has different incident angles in ordinary environment. Thus, the reflected light from the reflection layer 12 enters the liquid crystal portion 151 as scattered light.

The entering light includes light components traveling in the front direction and light components traveling in the oblique directions because it is scattered light. Of the light components traveling in the front direction, the left-handed circularly polarized light having the particular wavelength $\lambda_0$ passes through the liquid crystal portion 151 so as to be converted into linearly polarized light having a plane of polarization perpendicular to the transmission axis of the polarizing film 50. On the other hand, the other light components pass through the liquid crystal portion 151 so as to be converted into left-handed elliptically or circularly polarized light or right handed elliptically or circularly polarized light.

That is, when focusing attention only on the light components having a plane of polarization parallel with the transmission axis of the polarizing film 50, the ratio of intensity of the light components emitted by the display portion 101 with respect to intensity of the light components incident on the display portion 101 has wavelength dependence. In other words, the ratio of intensity of the display light emitted by the polarizing film 50 with respect to intensity of the illumination light incident on the polarizing film 50 has wavelength dependence. Therefore, the display portion 101 is seen colored. The reason that the display portion 101 is seen colored will be described later with reference to mathematical expressions.

Except for the planar shapes, the display portion 102 and the display portion 101 are different from each other only in the respect that the longitudinal directions of the grooves forming the diffraction gratings are different by 90°. Thus, the display portion 102 behaves as the same manner as the display portion 101 does except that the polarization plane rotation of the circularly polarized light or the elliptically polarized light is different. Therefore, similar to the display portion 101, the display portion 102 is seen colored.

The liquid crystal portion 153 of the display portion 103 is optically isotropic. Thus, ideally, the light emitted by the display portion 103 passes through the polarizing film 50 without being absorbed by the polarizing film 50. Therefore, the display portion 103 is seen iridescently.

Except for the planar shapes, the display portion 104 is different from the display portion 101 only in the respect that no groove is provided to the corresponding positions of the recess-forming layer 13 and the mesogens are not aligned. That is, in the display portion 104, the region 134 does not include a diffraction grating and the liquid crystal portion 154 is optically isotropic. Thus, ideally, the light emitted by the display portion 104 passes through the polarizing film 50 without being absorbed by the polarizing film 50. Therefore, the display portion 104 is seen silver whitely.

Note that typically, the mesogens in the liquid crystal portions 153 and 154 are slightly aligned. That is, typically, the liquid crystal portions 153 and 154 have slight degree of optical anisotropy. The reason will be described below.

In the case where the front surface of the recess-forming layer 13 is provided with grooves, it is possible that the grooves affect the alignment of the mesogens above the grooves. Also, in the case where the underlayer of the liquid crystal layer 15 is flat and no alignment process is performed, it is possible that the method of forming the liquid crystal layer 15 affects the alignment of the mesogens. For example, when the material of the liquid crystal layer 15 is applied in a single direction, it is possible that the mesogens are slightly aligned even in the case where the underlayer of the liquid crystal layer 15 is flat and no alignment process is performed.

For this reason, it is possible that the mesogens in the liquid crystal portions 153 and 154 are slightly aligned, and as a result, the liquid crystal portions 153 and 154 have slight degree of optical anisotropy. Note that, in this case, although the display portions 103 and 104 may be slightly colored, it does not affect appearances of the display portions and the discrimination among the display portions.

As above, the display portions 101 and 102 are seen colored, the display portion 103 is seen iridescently, and the display portion 104 is seen silver whitely. In addition, the display portions 101 and 102 are almost equal in brightness. Therefore, in the case where the optical device is observed from the front while superposing the polarizing film 50 thereon and irradiating it with white light, the display portions 101 to 103 are easy to discriminate from one another; and the display portions 101 and 102 are easy to discriminate from the display portion 103 and difficult to discriminate from each other as shown in FIG. 8.

Note that in this case, discriminating the display portions 101 and 102 from each other is impossible theoretically. However, due to the degree of precision for the polarizing film 50 and the grooves provided to the recess-forming layer 3, a difference in spectrum of display light may occur to the display portions 101 and 102 so as to make it possible to discriminate them from each other.

Here, the reason that the display portion 101 is seen colored will be described with reference to mathematical expressions. Note that the liquid crystal layer 151 is supposed to function as a quarter-wave plate for the light having the wavelength $\lambda_0$.

The linearly polarized light having the wavelength $\lambda_0$ that the polarizing film 50 emits in the direction of the normal line can be considered as the sum of a linearly polarized light component having a plane of polarization perpendicular to the X direction and a linearly polarized light component having a plane of polarization perpendicular to the Y direction. As described above, the refractive index of the liquid crystal portion 151 for the X direction is the extraordinary index $n_e$ and the refractive index for the Y direction is the ordinary index $n_o$. Thus, the liquid crystal portion 151 causes a phase difference of $\lambda_0/4$ between the linearly polarized light components in each of forward and return paths. That is, the liquid crystal portion 151 causes a phase difference of $\lambda_0/2$ between the linearly polarized light components in total. Therefore, the light having the wavelength of $\lambda_0$ that the display portion 101 emits in the direction of the normal line cannot pass through the polarizing film 50.

Meanwhile, a retardation Re depends on the thickness d and the refractive index anisotropy $\Delta n$ of a liquid crystal layer as shown in the following equation (1).

$$Re = \Delta n \times d \quad (1)$$

Here, $\Delta n = n_e - n_o$.

It is supposed that a pair of linearly polarizing film are arranged to face each other such that their transmission axes are orthogonal to each other and a liquid crystal layer is interposed therebetween such that the optic axis forms an angle of 45° with the transmission axes of the linearly polarizing films. In the case where one of the linearly polarizing films is irradiated with light having a wavelength of $\lambda$ from the direction of the normal line, supposing the intensity of light entering the liquid crystal layer to be $I_0$ and the intensity of light passing through the other linearly polarizing film to be I, the intensity I can be expressed as the following equation (2).

$$I = I_0 \times \sin^2(Re \times \pi/\lambda) \quad (2)$$

The refractive index anisotropy $\Delta n$ has wavelength dependency, and the refractive index anisotropy $\Delta n$ and the wavelength n are not in a proportional relation. Thus, as will be apparent from the equation (2), the spectrum of the transmitted light has a profile different from that of the spectrum of the incident light.

As above, in the case where a liquid crystal layer is sandwiched between linearly polarizing films, a transmitted light whose spectrum is different in profiles from the spectrum of the incident light can be obtained. Similar to this, in the case where a liquid crystal layer is sandwiched between a linearly polarizing film and a reflection layer, transmitted light whose spectrum is different in profiles from the spectrum of the incident light can be obtained. For this reason, the display portion 101 is seen colored.

Figure 9:
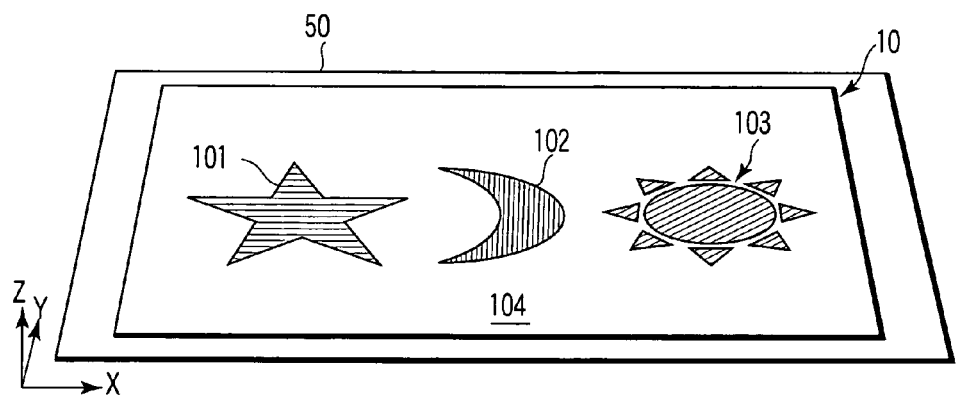
FIG. 9 is a perspective view showing another example of the image that the optical device shown in FIGS. 1 and 2 displays.

FIG. 9 is a perspective view showing another example of the image that the optical device shown in FIGS. 1 and 2 displays.

As shown in FIG. 9, when the state shown in FIG. 8 is changed such that the observation direction is inclined in the plane perpendicular to the X direction, the display portions 101 and 102 changes their display colors to colors different from each other in addition to that the display portion 103 changes it display color originated from the diffraction grating. As a result, discriminating the display portions 101 and 102 from each other becomes easy. For example, supposing that the display portions 101 and 102 are seen orange colored when observed from the direction of the normal line, by inclining the observation direction in the plane perpendicular to the X direction, the display portion 101 changes its color to red, while the display portion 102 changes its color to green. The reason for the color shifts occurred in the display portions 101 and 102 will be described below.

When the observation angle θ is inclined, the effective thickness d' of the liquid crystal layer expressed by the following equation (3) is changed to more than two times the actual thickness d of the liquid crystal layer, in addition to that the effective refractive index anisotropy $\Delta n'$ is changed from the refractive index anisotropy $\Delta n$.

$$d' = 2d/\cos\theta \quad (3)$$

That is, the retardation Re expressed by the above equation (1) is changed according to the observation angle, and thus, the intensity expressed by the above equation (2) changes. As a result, the spectrum of the display light changes its profile according to the observation angle.

The refractive index anisotropy $\Delta n'$ depends on the incident angle of the illumination light and the angle that the projection of a straight line parallel with the traveling direction of the illumination light onto the main surface of the liquid crystal layer forms with the optic axis of the liquid crystal layer. To be more specific, the refractive index anisotropy $\Delta n'$ of the liquid crystal portion 151 has an optic axis parallel with the X direction, and thus, is not changed when the observation direction is inclined in a plane perpendicular to the X direction. On the other hand, the refractive index anisotropy $\Delta n'$ of the liquid crystal portion 152 has an optic axis parallel with the Y direction, and thus, is changed when the observation direction is inclined in the plane perpendicular to the X direction.

As above, the display portion 101 causes a color shift due to the change in the effective thickness d' when the observation direction is inclined in the plane perpendicular to the X direction. On the other hand, the display portion 101 causes a color shift due to the changes in the effective thickness d' and the effective refractive index anisotropy $\Delta n'$ when the observation direction is inclined in the plane perpendicular to the X direction. Therefore, when the observation direction is inclined in the plane perpendicular to the X direction, the display portions 101 and 102 change their display colors to colors different from each other, and thus, the display portions 101 and 102 become easy to discriminate from each other.

Figure 10:
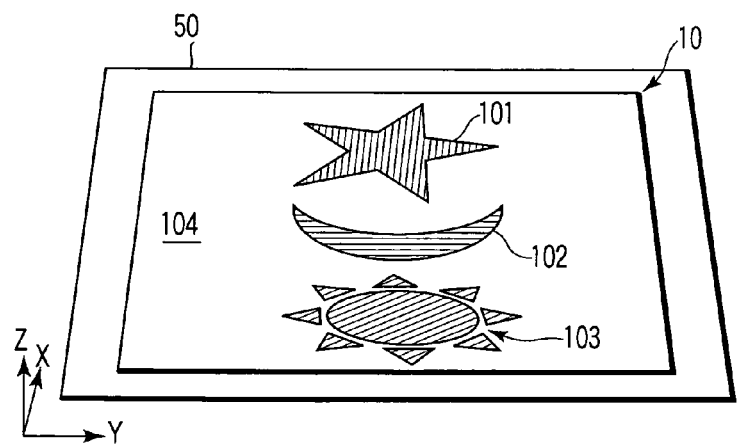
FIG. 10 is a perspective view showing still another example of the image that the optical device shown in FIGS. 1 and 2 displays.

FIG. 10 is a perspective view showing still another example of the image that the optical device shown in FIGS. 1 and 2 displays.

In FIG. 10, depicted is an image that can be seen in the case where the state shown in FIG. 9 is changed such that the optical device 10 and the polarizing film 50 are rotated about their normal line by 90° while keeping them superposed. When the optical device 10 is rotate about its normal line by 90° together with the polarizing film 50 while the observation angle is kept inclined, the display colors change their places between the display portion 101 and the display portion 102. In addition, as the rotation angle is increased, within a range of 0° to 45°, the effective grating constant of the diffraction grating is increased and the display color of the display portion 103 caused by the diffraction grating is changed correspondingly thereto, while within a range of 45° to 90°, the reverse change occurs. Therefore, the display colors of the display portion 103 before and after the rotation are the same. Note that the color shifts described with reference to FIG. 10 also occur in the case where the state shown in FIG. 9 is changed such that only the optical device 10 is rotated about its normal line by 90°.

Thus, the image displayed on the display device shown in FIGS. 1 and 2 is changed variously according to the observation conditions as follows.

The display portions 101 and 102 display the same color when observed in the direction of the normal line without the polarizing film 50.

When observed in the oblique direction without the polarizing film 50, the display portions 101 and 102 display the same color as that displayed when observed in the direction of the normal line without the polarizing film 50.

The display portions 101 and 102 display the same color when observed in the direction of the normal line via the polarizing film 50.

The display portions 101 and 102 display different colors when observed in the oblique direction via the polarizing film 50.

When observed in the oblique direction via the polarizing film 50, the display portions 101 and 102 display colors different from those displayed when observed in the direction of the normal line via the polarizing film 50.

The display portions 101 and 102 cause color shifts when observed from the oblique direction via the polarizing film 50 while rotating the optical device 10 about its normal line with the position and the orientation of the polarizing film 50 unchanged.

The display portions 101 and 102 cause color shifts when observed from the oblique direction via the polarizing film 50 while rotating the polarizing film 50 about its normal line with the position and the orientation of the optical device 10 unchanged.

The display colors change their places between the display portions 101 and 102 when observed from the oblique direction via the polarizing film 50 while rotating the optical device 10 about its normal line with the position and the orientation of the polarizing film 50 unchanged.

The display colors change their places between the display portions 101 and 102 when observed from the oblique direction via the polarizing film 50 while rotating the polarizing film 50 about its normal line with the position and the orientation of the optical device 10 unchanged.

The display portion 103 displays interference colors. Note that in the case where the grooves provided to the recess-forming region 133 form a unidirectional diffusing pattern, the display portion 103 exhibits light-scattering anisotropy.

The display portion 103 changes its color and brightness according to the observation angle.

The display portion 103 causes a color shift when observed in the oblique direction while rotating the optical device 10 about its normal line.

The display portion 103 does not cause a color shift when observed in the oblique direction via the polarizing film 50 while rotating the polarizing film 50 about its normal line. However, in the case where the liquid crystal portion 153 is not all the way optically isotropic, the display portion 103 causes a slight color shift when observed in the oblique direction via the polarizing film 50 while rotating the polarizing film 50 about its normal line.

When observed in the direction of normal line without the polarizing film 50, the display portion 104 displays the same color as those displayed on the display portions 101 and 102.

When observed in the oblique direction without the polarizing film 50, the display portion 104 displays the same color as that displayed when observed in the direction of the normal line without the polarizing film 50. However, in the case where the liquid crystal portion 154 is not all the way optically isotropic, when observed in the oblique direction without the polarizing film 50, the display portion 104 displays a color slightly different from that displayed when observed in the direction of the normal line without the polarizing film 50.

The display portion 104 does not cause a color shift when observed in the oblique direction while rotating the optical device 10 about its normal line.

The display portion 104 does not cause a color shift when observed in the oblique direction via the polarizing film 50 while rotating the polarizing film 50 about its normal line. However, in the case where the liquid crystal portion 154 is not all the way optically isotropic, the display portion 104 causes a slight color shift when observed in the oblique direction via the polarizing film 50 while rotating the polarizing film 50 about its normal line.

As described above, the image displayed on the optical device 10 shown in FIGS. 1 and 2 is variously changed according to the observation conditions, and thus, the optical device 10 provides, for example, excellent forgery-preventing effect, decorative effect and/or aesthetic effect.

For example, supposing the labeled article including the optical device 10 and an article supporting it is a genuine article, an article whose genuineness is unknown can be judged as a non-genuine article in the case where the particular article does not have one or more characteristics described above. That is, it is possible to discriminate the article whose genuineness is unknown between a genuine article and a non-genuine article. Therefore, forgeries of printed matters including certificates such as securities, bank bills and identifications and credit cards or high-grade articles such as art objects can be prevented or suppressed. Further, the optical kit including the optical device 10 and the polarizing film 50 can be utilized for the above authenticity check, and can also be utilized as a toy, a learning material, a decorative article, etc. That is, the optical device 10 can be utilized not only as a security device but also for other applications.

Next, the second embodiment of the present invention will be described.

Figure 11:
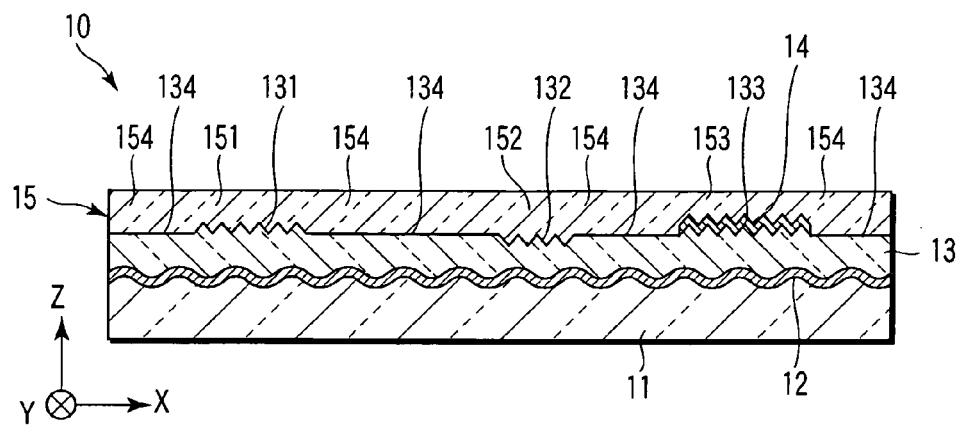
FIG. 11 is a sectional view schematically showing an optical device according to the second embodiment of the present invention.

FIG. 11 is a sectional view schematically showing an optical device according to the second embodiment of the present invention.

The optical device 10 has the same structure as that described with reference to FIGS. 1 and 2 except that the following construction is employed. That is, in the optical device 10, the portion of the recess-forming layer 13 corresponding to the recess-forming region 131 is thicker than the portion of the recess-forming layer 13 corresponding to the recess-forming region 132. Further, the liquid crystal portion 151 is thinner than the liquid crystal portion 152. In addition, the longitudinal directions of the grooves provided to the recess-forming region 131 are parallel with the Y direction.

When observed by the unaided eye, the optical device 10 displays the same image as that described with reference to FIG. 7. However, when observed via a polarizer, the optical device 10 displays an image different from that displayed on the optical device 10 described with reference to FIGS. 1 and 2.

Figure 12:
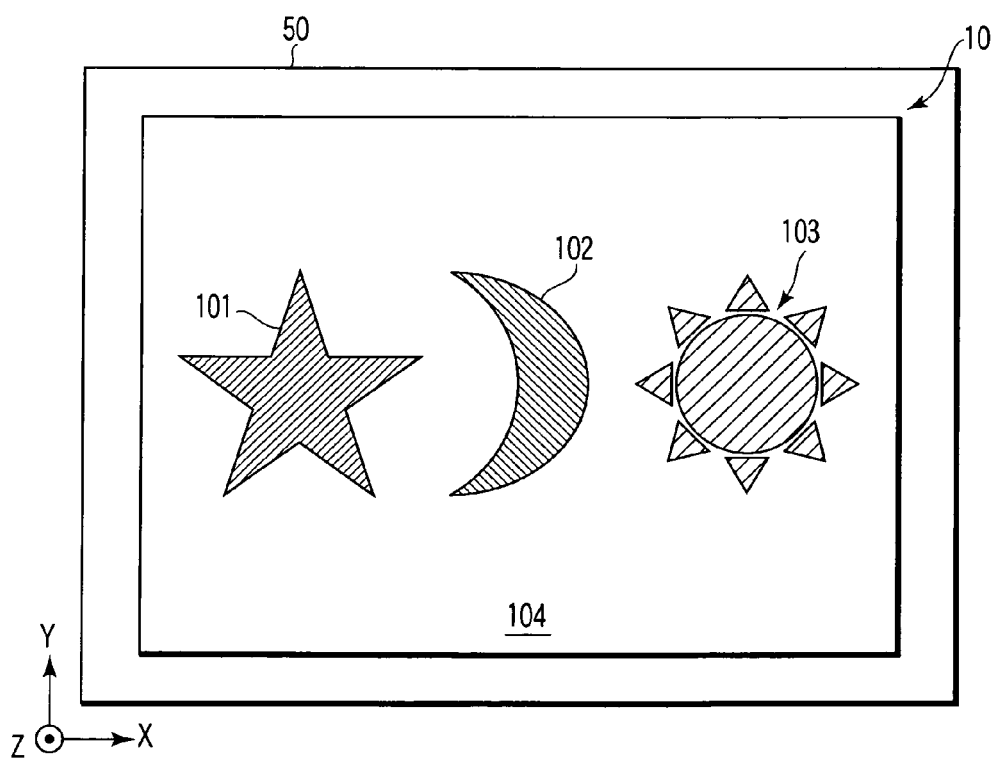
FIG. 12 is a plan view schematically showing an example of the image that can be observed when a linear polarizer film is superposed on the optical device shown in FIG. 11.
Figure 13:
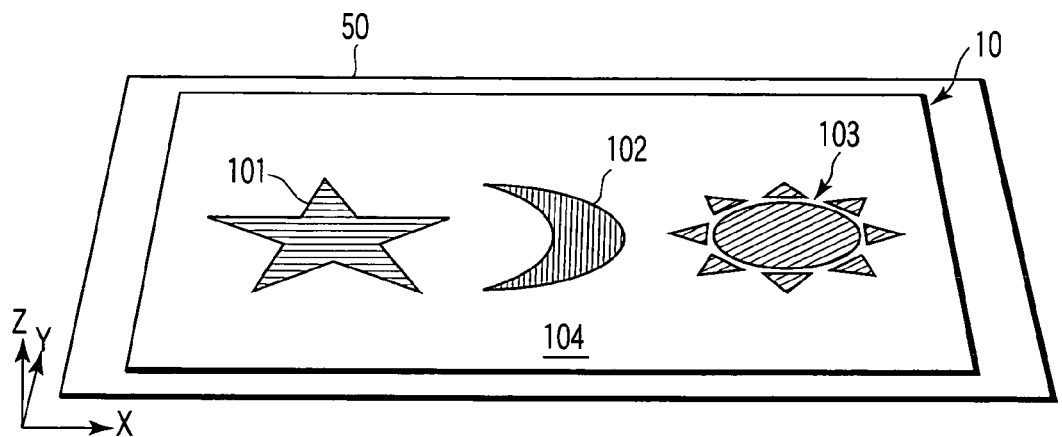
FIG. 13 is a perspective view showing another example of the image that the optical device shown in FIG. 11 displays.
Figure 14:
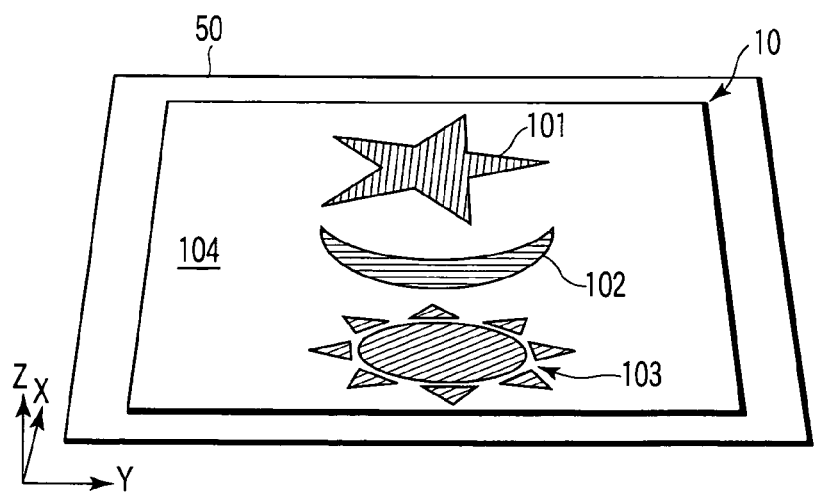
FIG. 14 is a perspective view showing still another example of the image that the optical device shown in FIG. 11 displays.

FIG. 12 is a plan view schematically showing an example of the image that can be observed when a linear polarizer film is superposed on the optical device shown in FIG. 11. FIG. 13 is a perspective view showing another example of the image that the optical device shown in FIG. 11 displays. FIG. 14 is a perspective view showing still another example of the image that the optical device shown in FIG. 11 displays.

In FIGS. 12 to 14, the optical device 10 and the absorptive linearly polarizing film 50 are superposed such that the transmission axis of the polarizing film 50 forms an angle of 45° in counterclockwise direction with respect to the X direction when observing the optical device 10 from the side of the polarizing film 50. When such an arrangement is employed and the structure is observed from the front, the display portions 101 to 104 are easy to discriminate from one another as shown in FIG. 12. This will be described in more detail.

As will be apparent from the descriptions referring to the equations (1) and (2), the colors displayed on the display portions 101 and 102 when the polarizing film 50 is superposed on the optical device 10 and the structure is observed from the front depend on the thicknesses d of the liquid crystal portions 151 and 152. Since the liquid crystal portion 151 and the liquid crystal portion 152 are different in thickness from each other, the display portions 101 and 102 display different colors. For example, one of the display portions 101 and 102 is seen red, while the other is seen yellow.

As above, the display portions 101 and 102 display different colors when the polarizing film 50 is superposed on the optical device 10 and the structure is observed from the front. Therefore, the color displayed on the display portion 101 when the state shown in FIG. 12 is changed such that the observation direction is inclined in the plane perpendicular to the X direction is different from the color displayed on the display portion 102 when the state shown in FIG. 9 is changed such that the optical device 10 and the polarizing film 50 are rotated about their normal line by 90° while keeping them superposed. Similarly, the color displayed on the display portion 102 when the state shown in FIG. 12 is changed such that the observation direction is inclined in the plane perpendicular to the X direction is different from the color displayed on the display portion 101 when the state shown in FIG. 9 is changed such that the optical device 10 and the polarizing film 50 are rotated about their normal line by 90° while keeping them superposed.

That is, different from the optical device 10 described with reference to FIGS. 1 and 2, the optical device 10 does not have the following characteristics.

The display portions 101 and 102 display the same color when observed in the direction of the normal line via the polarizing film 50.

The display colors change their places between the display portions 101 and 102 when observed from the oblique direction via the polarizing film 50 while rotating the optical device 10 about its normal line with the position and the orientation of the polarizing film 50 unchanged.

The display colors change their places between the display portions 101 and 102 when observed from the oblique direction via the polarizing film 50 while rotating the polarizing film 50 about its normal line with the position and the orientation of the optical device 10 unchanged.

Instead, the optical device 10 has the following characteristics.

The display portions 101 and 102 display different colors when observed in the direction of the normal line via the polarizing film 50.

The display portions 101 and 102 cause color shifts while displaying different colors when observed from the oblique direction via the polarizing film 50 while rotating the optical device 10 about its normal line with the position and the orientation of the polarizing film 50 unchanged.

The display portions 101 and 102 cause color shifts while displaying different colors when observed from the oblique direction via the polarizing film 50 while rotating the polarizing film 50 about its normal line with the position and the orientation of the optical device 10 unchanged.

Therefore, the optical device 10 also provides, for example, excellent forgery-preventing effect, decorative effect and/or aesthetic effect. Thus, supposing the labeled article including the optical device 10 and an article supporting it is a genuine article, an article whose genuineness is unknown can be judged as a non-genuine article in the case where the particular article does not have one or more characteristics described above. That is, it is possible to discriminate the article whose genuineness is unknown between a genuine article and a non-genuine article. Further, the optical kit including the optical device 10 and the polarizing film 50 can be utilized for the above authenticity check, and can also be utilized as a toy, a learning material, a decorative article, etc. That is, the optical device 10 can be utilized not only as a security device but also for other applications.

In the case where the liquid crystal portion 151 and the liquid crystal portion 152 are made different in thicknesses, the difference between the thicknesses is set, for example, within a range of 0.1 μm to 5 μm. In the case where the difference is small, discriminating the display portion 101 and the display portion 102 from each other is difficult when observed via the polarizing film 50. In the case where the difference is large, it is difficult to align the mesogens at a high degree of order in the thicker liquid crystal portion. As a result, it becomes difficult to display the colors as designed when observed via the polarizing film 50.

Various modifications can be possible to the above-described optical device 10.

For example, a part of the front surface of the reflection layer 12 may be a flat mirror plane with no fine relief structure. In this case, of the front surface of the recess-forming layer 13, at least a part of the region corresponding to the mirror plane of the reflection layer 12 may be provided grooves that form a diffraction grating. This makes it possible to discriminate the part from the other part even in the case where observed by the unaided eye.

The optical device 10 may further include an almost optically isotropic transparent or semitransparent layer between the reflection layer 12 and the recess-forming layer 13. When such an intermediate layer is used, it is possible to promote the adhesion or to prevent the relief structure provided to the front surface of the reflection layer 12 from affecting the profile of the front surface of the recess-forming layer 13.

The optical device 10 may further include the protection layer or the adhesive layer described below.

Figure 15:
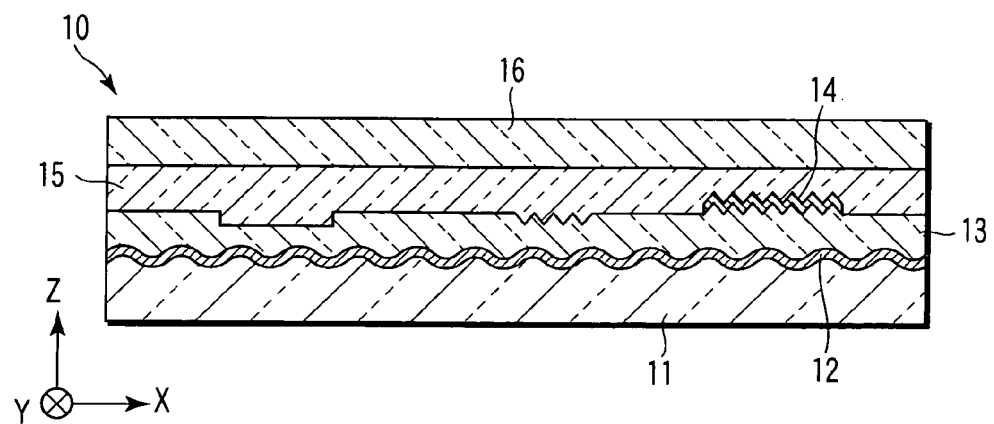
FIG. 15 is a sectional view showing a modification of the optical device shown in FIG. 1.

FIG. 15 is a sectional view showing a modification of the optical device shown in FIG. 1.

The optical device 10 shown in FIG. 15 has the same structure as that described with reference to FIGS. 1 and 2 except that it further includes the protection layer 16 covering the liquid crystal layer 15. When the protection layer 16 is provided, damage and deterioration of the liquid crystal layer 15, etc. can be made difficult, and thus, it becomes possible to suppress the deterioration of the image displayed on the optical device 10.

As the material of the protection layer 16, for example, hard coat materials excellent in scratch resistance can be used. The protection layer 16 may be transparent and colored or transparent and colorless.

Figure 16:
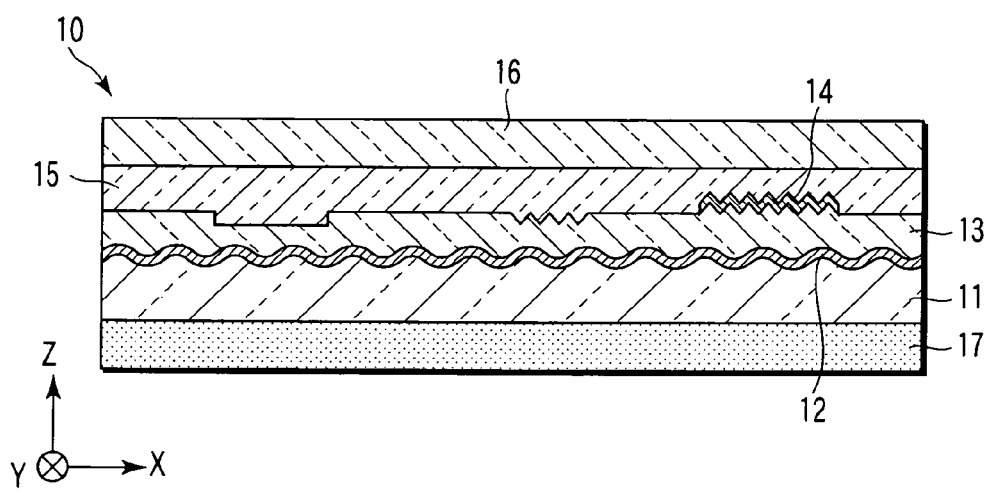
FIG. 16 is a sectional view showing another modification of the optical device shown in FIG. 1.

FIG. 16 is a sectional view showing another modification of the optical device shown in FIG. 1.

The optical device 10 shown in FIG. 16 has the same structure as that described with reference to FIG. 15 except that it further includes the adhesive layer 16 covering the back surface of the substrate 11. The optical device 10 is suitable for the application in which it is adhered to an article. Note that the adhesive layer 17 may be covered with a release paper.

The display portion 103 may be omitted from the optical device 10. That is, the second reflection layer 14 can be omitted. In this case, the same effects as described above can be achieved except that the visual effect described on the display portion 103 cannot be obtained.

In the optical device 10 shown in FIGS. 1 and 2, the display portion 101 and the display portion 102 may be adjacent to each other. As described above, in the case where the polarizing film 50 is superposed on the optical device 10 shown in FIGS. 1 and 2 and this is observed from the front, the display portions 101 and 102 display almost the same color. Therefore, when the display portion 101 and the display portion 102 are adjacent to each other, it becomes impossible or difficult to discriminate the boundary between the display portion 101 and the display portion 102. That is, in this case, the display portion 101 and the display portion 102 form a latent image that is visualized when the polarizing film 50 is superposed thereon and the observation angle is inclined with respect to the normal direction in the plane perpendicular to the X direction.

The region 134 may be provided with grooves or subjected to an alignment process such as rubbing process or photo-alignment process. Further, in at least a part of the liquid crystal portion 154, the mesogens may be aligned in the longitudinal directions of the grooves. For example, in at least a part of the liquid crystal portion 154, the mesogens may be aligned almost perpendicular to the Z direction and oblique to the X direction, preferably at an angle of 45°.

In this case, when observed from the direction oblique to the Z direction without the polarizing film 50, the display portion 104 displays the same color as that displayed when observed from the direction without the polarizing film 50. Further, when observed from the Z direction via the polarizing film 50, the display portion 104 displays a color different from that displayed when observed from the Z direction without the polarizing film 50. Furthermore, when observed from the direction oblique to the Z direction via the polarizing film 50, the display portion 104 displays a color different from those displayed when observed from the Z direction without the polarizing film 50 and when observed from the Z direction via the polarizing film 50. In addition, when observed from the Z direction via the polarizing film 50, the display portion 104 displays a color different form those displayed on the display portions 101 to 103.

In the above-described optical device 10, the reflection layer 12 is provided to the main surface of the substrate 11 on the side of the liquid crystal layer 15. Alternatively, the reflection layer 12 may be provided to the opposite surface of the substrate 11, which is opposite to the main surface on the side of the liquid crystal layer 15, or opposite surface of the liquid crystal layer, which is opposite to the main surface on the side of the substrate 11. Note that in this case, the substrate 11 should have light-transmitting property. Also, in this case, typically, it is necessary that the substrate 11 does not have refractive index anisotropy.

As the reflection layer 12, a specular reflection layer may be used instead of the reflection layer having light-scattering property. However, in this case, of the above-described effects, the effect originated from the light-scattering property of the reflection layer 12 cannot be obtained. For example, in the case where the grooves provided to the regions 131 and 132 form diffraction gratings, it is possible that the regions 131 and 132 are seen colored differently when observing the optical device 10 by the unaided eye.

As the polarizer, other polarizer such as plate-like polarizer may be used instead of the polarizing film 50. A circular polarizer or elliptical polarizer may be used instead of the linear polarizer. In this case, a color shift different from that achieved in the case where the linear polarizer is used can be observed. Thus, more complicated visual effects can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical device comprising:
    a layered structure including
        a recess-forming layer with light-transmitting property, a main surface of which includes one or more recess-forming regions each provided with grooves equal in longitudinal directions to one another and adjacent to one another in a direction crossing the longitudinal directions, wherein one or more of the grooves are discontinuous in the respective longitudinal directions, and
        a liquid crystal layer supported by the main surface and made of a solidified liquid crystal material; and
    a first reflection layer facing the layered structure, wherein the first reflection layer has a light-scattering property such that each portion of the optical device corresponding to the one or more recess-forming regions is seen silver whitely when the optical device is irradiated with white light and observed by the unaided eye.

* * * * *